(12) United States Patent
Gruddanti et al.

(10) Patent No.: US 12,386,750 B2
(45) Date of Patent: Aug. 12, 2025

(54) LAST LEVEL CACHE HIERARCHY IN CHIPLET BASED PROCESSORS

(71) Applicant: ADVANCED MICRO DEVICES, INC., Santa Clara, CA (US)

(72) Inventors: Srikanth Reddy Gruddanti, Bangalore (IN); Krishnaiah Gummidipudi, Bangalore (IN); Prasant Kumar Vallur, Hyderabad (IN); David Hugh McIntyre, Santa Clara, CA (US); Ramon Apostol Mangaser, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 81 days.

(21) Appl. No.: 18/374,757

(22) Filed: Sep. 29, 2023

(65) Prior Publication Data
US 2025/0110875 A1    Apr. 3, 2025

(51) Int. Cl.
*G06F 12/0811* (2016.01)
(52) U.S. Cl.
CPC .... *G06F 12/0811* (2013.01); *G06F 2212/283* (2013.01)

(58) Field of Classification Search
CPC ............ G06F 12/0811; G06F 2212/283
See application file for complete search history.

(56) References Cited

U.S. PATENT DOCUMENTS

| | | | |
|---|---|---|---|
| 2008/0282032 A1* | 11/2008 | Shen | G06F 12/0811 711/117 |
| 2021/0097013 A1* | 4/2021 | Saleh | G06F 12/0837 |
| 2021/0098419 A1* | 4/2021 | Saleh | H01L 21/563 |
| 2024/0272908 A1* | 8/2024 | Liljedahl | G06F 9/30043 |
| 2024/0303195 A1* | 9/2024 | Wu | G06F 12/0891 |

* cited by examiner

Primary Examiner — Sean D Rossiter

(57) ABSTRACT

An accelerated processor includes a processor core die including a plurality of compute units, the plurality of compute units including a first level (L1) cache. The accelerated processor also includes a plurality of memory cache dies coupled to the processor core die, the plurality of memory cache dies including a last level cache (LLC) such as a level 3 (L3) cache. The accelerated processor includes an LLC controller to issue a cache access request to the LLC and, based on a latency of the cache access request, direct the cache access request to a subset of the plurality of memory cache dies.

20 Claims, 5 Drawing Sheets

LAST LEVEL CACHE HIERARCHY IN CHIPLET BASED PROCESSORS

BACKGROUND

Some processing units include multiple processor cores on a single semiconductor die. The processor cores concurrently execute numerous threads or other workloads to increase the processing unit's throughput. In order to accelerate access to the data required to execute the threads or workgroups, these processing units often utilize a cache hierarchy. The cache hierarchy includes, for example, a local first level (L1) cache at the processor core level, an intermediate second level (L2) cache, and a last level cache (LLC) (e.g., a third level (L3) cache) shared among the processor cores of the processing unit. The cache levels have limited capacities and are often subject to concurrent accesses from a large number of threads or workgroups executing at the processor cores. As such, efficient management and allocation of data across the different levels in the cache hierarchy is one factor in improving processing unit performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
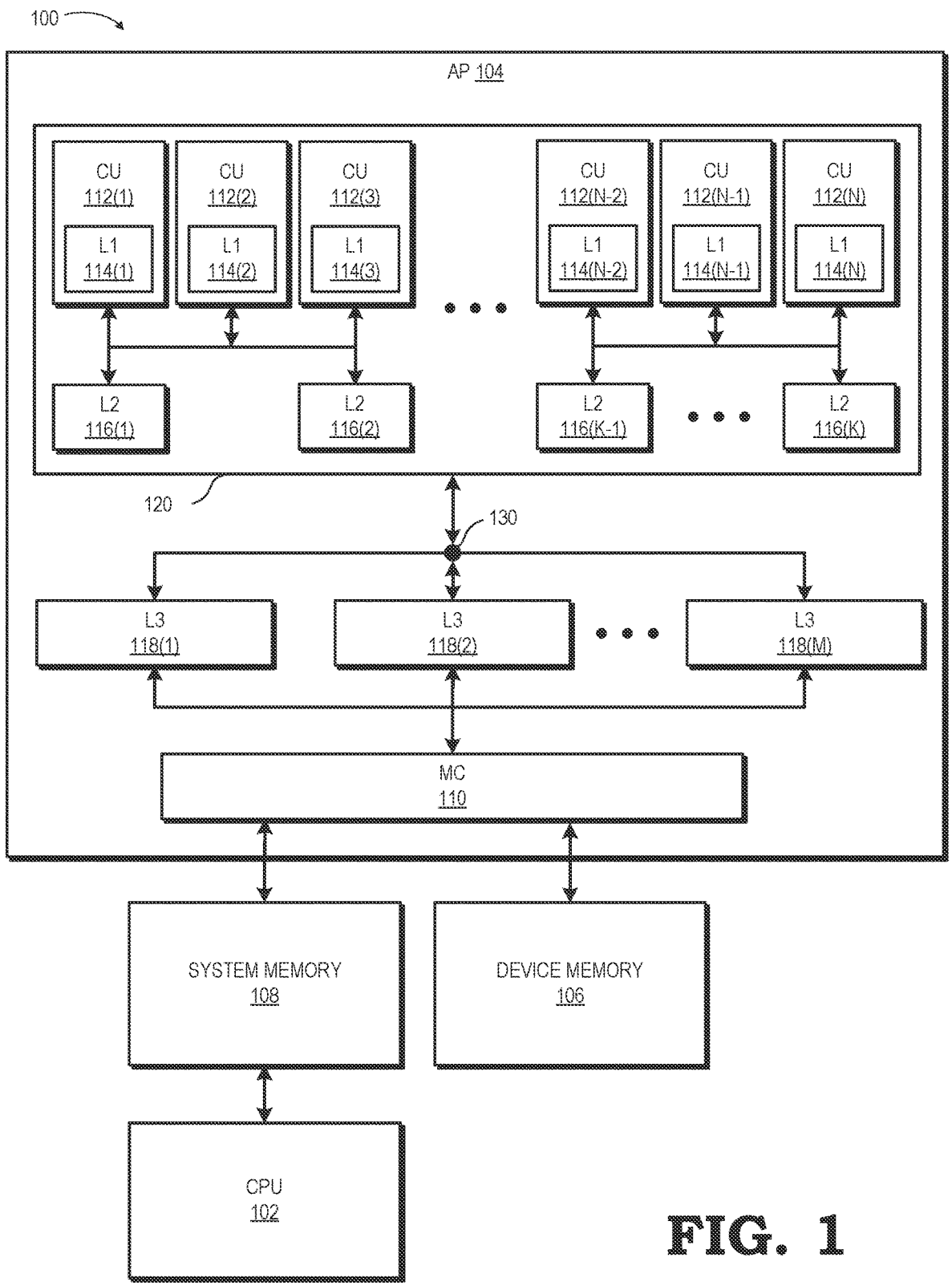
FIG. 1 is an example of a processing system with an accelerated processor configured to employ a LLC hierarchy at the L3 cache, in accordance with various implementations.

Processing units such as accelerated processors typically include a large number of processor cores (also referred to as compute units (CUs)) that are configured to execute operations concurrently or in parallel. The operations are, in some cases, associated with an application running on a central processing unit (CPU) or other host processor in a processing system including the accelerated processor. In various scenarios, the accelerated processor relies on different bandwidth management techniques to achieve higher throughput for executing the operations at its processor cores. These bandwidth management techniques include managing the allocation of and access to data across the different levels (e.g., the L1, L2, and L3 caches) of the cache hierarchy. In general, when executing operations at multiple ones of its processor cores, the accelerated processor experiences higher latencies for LLC accesses since the LLC cache (e.g., an L3 cache) is shared among multiple processor cores. Furthermore, in some processing units, the LLC is located on multiple memory cache dies (also referred to herein as chiplets) that are separate from the processor core die on which the processor cores and higher levels of cache (e.g., the L1 cache and L2 cache) are located. These memory cache dies (MCDs) typically have different die-to-die interface lengths with the processor core die. Conventional cache management approaches for these types of configurations do not account for the different die-to-die interface lengths between the processor core die and the multiple MCDs. Accordingly, the higher LLC latencies become more noticeable in accelerated processor configurations implementing the LLC on MCDs due to the different die-to-die interface lengths between the MCDs and the processor core die. FIGS. 1-5 illustrate techniques that leverage the different die-to-die interface lengths between the LLC MCDs and the processor core die to implement a non-uniform cache access (NUCA) technique at the LLC to improve LLC latency times, thereby improving system performance.

To illustrate, in some implementations an accelerated processor includes a processor core die with a plurality of CUs. The processor core die includes a first level cache (L1 cache) at each of the CUs, and a second level cache (L2 cache) on the processor core die. The accelerated processor further includes multiple MCDs. The MCDs implement a last layer cache (LLC) such as a third level cache (L3 cache). The LLC MCDs are connected to the processor core die through a series of die-to-die interfaces that are routed to the processor core die through a shared physical (PHY) interface point (IP). In some cases, the shared PHY IP includes serializer/deserializer (SerDes) circuitry with a clock domain crossing structure which uses a first in, first out (FIFO) queue for writes and/or reads to the LLC MCDs. The LLC MCDs are grouped or divided into a plurality of subsets of LLC MCDs based on their respective die-to-die interface lengths with the shared PHY IP, and a cache controller at the accelerated processor assigns a different FIFO write-read pointer separation (also referred to as FIFO pointer separation or pointer separation) to each subset. As used herein, the term "subset" is intended to mean a set each of whose elements is an element of an inclusive set. That is, a set A is a subset of set B if all of the elements of set A (which, in some implementations, include only one element) are also elements of set B. For example, a subset of a set of six memory cache dies in some implementations includes one memory cache die of the six memory cache dies, in other implementations includes two memory cache dies of the six memory cache dies, and so on.

For example, if multiple pairs of the LLC MCDs are symmetrically arranged around the processor core die, a first subset of the LLC MCDs corresponds to a first pair of LLC MCDs with the shortest die-to-die interface length, a second subset of the LLC MCDs corresponds to a second pair of LLC MCDs with the next shortest die-to-die interface length, and so on. Based on these groupings and their assigned FIFO pointer separations, the cache controller implements an LLC hierarchy. That is, the first level of the LLC hierarchy is allocated to the first pair of LLC MCDs with the shortest die-to-die interface length (and thus, the lowest FIFO pointer separation), a second level of the LLC hierarchy is allocated to the second pair of LLC MCDs with the next shortest die-to-die interface length, and so on. The cache controller allocates critical applications or data to the first level of the LLC hierarchy and allocates non-critical applications or data to the second or lower levels of the LLC hierarchy. This reduces LLC latencies for critical applications or data since these types of applications or data are allocated to LLC MCDs with shorter round trip times between the processor core die and the respective LLC MCD. This, in turn, reduces the overall cache latency in the accelerated processor, thereby resulting in improved processing performance.

In some implementations, for a given supply voltage and frequency of operation, the techniques described herein translate to approximately 4 to 5 core clock cycles of latency improvement at the L3 cache. Considering that a typical average cache latency amounts to 60 core clock cycles, the average latency improvement is improved by about 6-8%. This results in an instructions per cycle (IPC) improvement of about 1% or more for all memory latency bound applications, which is significant for real time workloads or high performance computing (HPC) applications.

In further implementations, the techniques described herein are used in die harvesting to identify an order or preference for which MCD (i.e., L3 cache chiplet) positions are populated in processing units with a reduced L3 cache. For example, by utilizing the techniques described herein, the MCDs at positions associated with shorter latency times are implemented in processing units having fewer MCDs while the other MCD positions are left empty. This improves the performance of processing units with a reduced L3 cache size.

FIG. 1 illustrates an example of a processing system 100 configured to employ a NUCA hierarchy at the LLC in accordance with various implementations. In the illustrated example, the processing system 100 includes a central processing unit (CPU) 102, an accelerated processor (AP) 104, a device memory 106 utilized by the AP 104, and a system memory 108 shared by the CPU 102 and the AP 104. The memories 106, 108 include any of a variety of random access memories (RAMs) or combinations thereof, such as a double-data-rate dynamic random access memory (DDR DRAM), a graphics DDR DRAM (GDDR DRAM), and the like.

In some implementations, the AP 104 is a parallel processor that is able to execute a single instruction on a multiple data or threads in a parallel manner. Examples of parallel processors (also referred to as co-processors, vector processors, or the like) include processors such as graphics processing units (GPUs), massively parallel processors, single instruction multiple data (SIMD) architecture processors, machine learning (ML) application-specific integrated circuits (ASICs), and single instruction multiple thread (SIMT) architecture processors for performing graphics, machine intelligence or compute operations. In some implementations, the one or more parallel processors are separate devices that are included as part of a computer. In other implementations such as advance processor units, the one or more parallel processors are included in a single device along with a host processor such as a central processor unit (CPU). Although the description herein uses an accelerated processor (AP) for illustration purposes, the implementations and implementations described below are applicable to other types of parallel processors.

As illustrated, the AP 104 includes a memory controller (MC) 110 for managing address translation operations for one or both of the memories 106, 108 and a plurality of compute units (CUs) 112 (numbered 112(1), 112(2), 112(3), and through 112(N)). CUs 112 are also interchangeably referred to as AP cores or processor cores herein. In various implementations, the CUs 112 each include one or more SIMD units (not shown) that execute a thread concurrently with execution of other threads in a wavefront, such as according to a single-instruction, multiple-data (SIMD) execution model. In some implementations, the plurality of CUs 112(1) to 112(N) is positioned on a processor core die 120. While one processor core die 120 is shown in FIG. 1 for clarity purposes, in some implementations, the AP 104 includes additional processor core dies 120.

The MC 110 operates as the interface between the cache hierarchy in the AP 104 and the system memory 108. Data to be cached in the cache hierarchy typically is manipulated as blocks of data referred to as "cache lines," and which are addressed or otherwise located in a memory hierarchy using a physical address of system memory 108. Cache lines are accessed from the system memory 108 by the memory controller (MC) 110 in response to memory requests from the AP 104.

The AP 104 further includes a cache hierarchy including one or more levels of data and instruction caching, such as a first level (L1), a second level (L2), a third level (L3) of caches, and the like. Each cache level includes one or more caches at that level. To illustrate, each CU 112 implements a first level of cache such as private level 1 (L1) cache 114, which are depicted as L1 caches 114(1), 114(2), 114(3), and through 114(N) (each L1 cache 114 associated with a corresponding one of the CUS 112(1), 112(2), 112(3), and through 112(N)). Each of the L1 caches 114 is a private cache for the CU 112 that stores a small amount of recently used or frequently accessed data for its associated CU 112.

The AP 104 also implements a second level of cache such as a level 2 (L2) cache 116 and a third level of cache such as a shared level 3 (L3) cache 118. The L2 cache 116 is depicted as L2 caches 116(1) through 116(J) and 116(K). The shared L3 cache 118 is depicted as L3 caches 118(1), 118(2), and through 118(M). The L3 caches 118 are shared by the CUs 112 of the AP 104, and thus are also shared by at least the L1 caches 114 and L2 caches 116. In some implementations, the shared L3 cache level represents a last level cache (LLC). The LLC represents the last cache in the cache hierarchy of the AP 104. Although the illustrated example includes three levels, in other implementations the cache hierarchy includes fewer than three levels or more than three levels of cache. The various levels of the cache hierarchy cache data for access and manipulation by the AP 104. Typically, caches at a lower level (e.g., L1) tend to have lower storage capacity and lower access latencies, while caches at the higher level (e.g., L3) tend to have higher storage capacity and higher access latencies. Accordingly, cache lines of data are transferred among the caches of different cache levels so as to optimize utilization of the cache data in view of the respective caches' storage capacities and access latencies.

As illustrated, in some implementations, the L3 caches 118 are located separate from the processor core die 120 housing the plurality of CUs 112, including the L1 caches 114, and the L2 caches 116. For example, in some implementations, each of the L3 caches 118 are located on one or more memory cache dies (MCDs) or chiplets that are adjacent to the processor core die 120 in the AP 104. That is, in some implementations, L3 cache 118(1) is positioned on a first MCD or chiplet, L3 cache 118(2) is positioned on a second MCD or chiplet, and so forth.

In some implementations, the plurality of MCDs implementing the L3 caches share a shared PHY interface point 130 with the processor core die 120. For example, in some configurations, the shared PHY interface point 130 includes a Serializer/Deserializer (SerDes) circuitry with a clock domain crossing structure (not picture in FIG. 1). The clock domain crossing structure, in some implementations, uses a first in, first out (FIFO) queue for writes and/or reads to the MCDs implementing the L3 caches 118. Due to the many-to-few communication pattern between the CUs 112 and the L3 caches 118 in the AP 104 and the L3 caches 118 being implemented on an MCD (or chiplet) separate from the processor core die 120, the latencies associated with L3 cache accesses are relatively long compared with the cache access latencies to the L1 caches 114 and L2 caches 116. Accordingly, as described herein, the processing system 100 leverages the different die-to-die distances between the processor core die 120 and the MCDs with the L3 caches 118 to implement a NUCA hierarchy across the L3 caches 118. For example, if M=3 in FIG. 1 (i.e., there are three L3 caches 118(1) to 118(3)), L3 cache 118(2) is the closest L3 cache to the shared PHY interface point 130. Thus, the roundtrip latency for accessing L3 cache 118(2) is the lowest among the L3 caches 118. Accordingly, the AP 104 designates L3 cache 118(2) as belonging to a first level in the L3 cache hierarchy and assigns a first FIFO pointer separation to L3 cache 118(2). The AP 104 designates L3 caches 118(1) and L3 cache 118(3) to a second level in the L3 cache hierarchy since they are both an equal distance from the shared PHY interface point 130 but farther than L3 cache 118(2). The AP 104 also assigns a second FIFO pointer separation to the second level of the L3 cache hierarchy, i.e., to L3 caches 118(1) and 118(3), that is longer than the first FIFO pointer separation. Thus, L3 cache 118(2) has a shorter FIFO pointer duration than L3 caches 118(1) and 118(3).

In this manner, the AP 104 provides a physically aware pointer separation for different ultra-short reach (USR) PHY instances between the processor core die 120 and the L3 caches 118, and, therefore, different roundtrip latencies to the L3 caches (or other LLCs) based on the clock structure of the AP 104. The AP 104 uses these variable latencies to implement the NUCA techniques at the L3 cache as described herein to reduce the average L3 cache access latency time. For example, the AP 104 leverages the different levels in the L3 cache hierarchy by allocating frequently used or critical applications/data to the first level of the L3 cache hierarchy (i.e., to L3 cache 118(2) in the above example) and less frequently used or non-critical applications/data to the second level of the L3 cache hierarchy (i.e., to L3 caches 118(1) and 118(3) in the above example). Accordingly, the latency times associated with more frequently used or critical applications is reduced, thereby improving overall processing system 100 performance.

Figure 2:
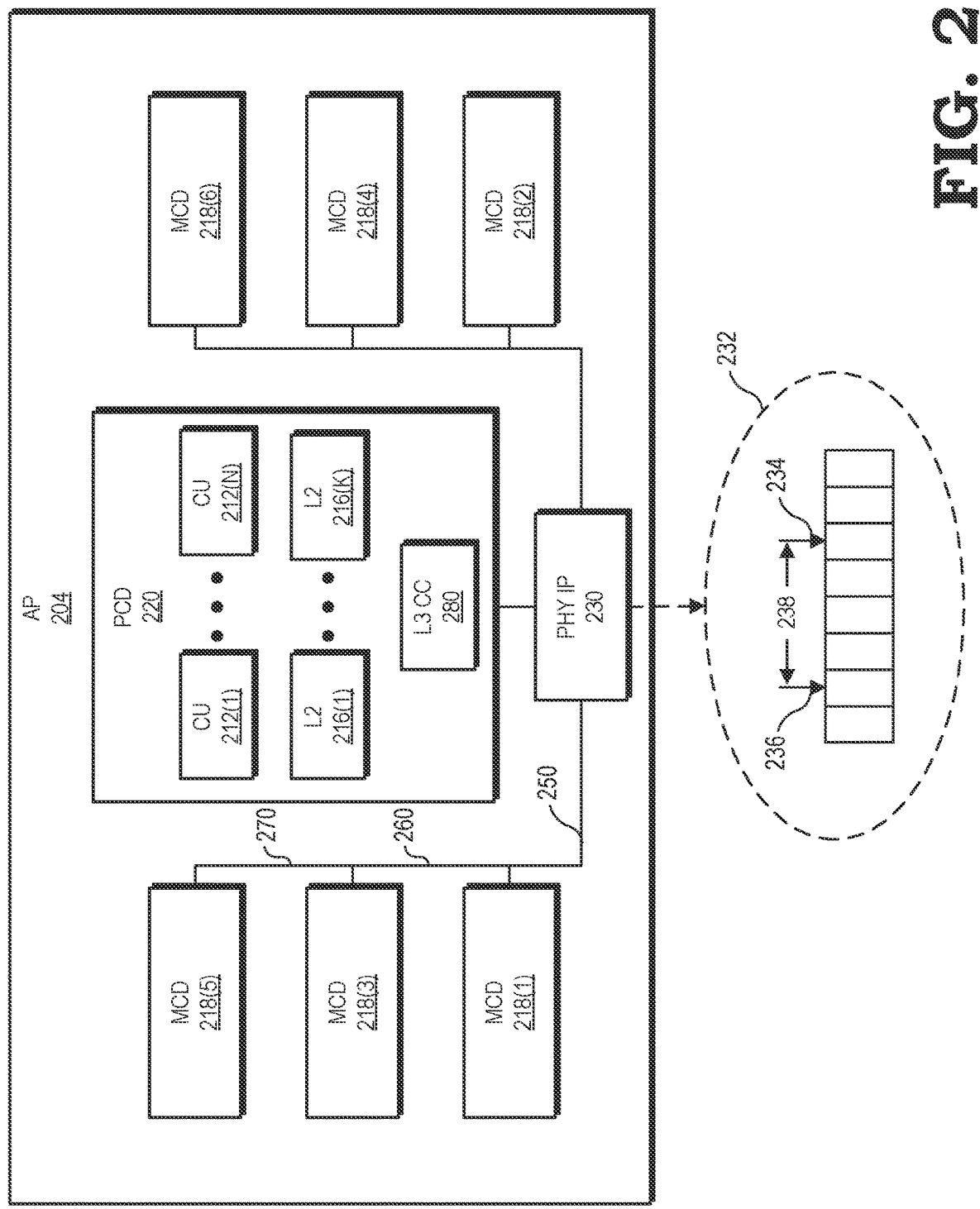
FIGS. 2 and 3 shows examples of an accelerated processor, such as one corresponding to the accelerated processor of FIG. 1, to employ an LLC hierarchy across multiple memory cache dies (MCDs), in accordance with various implementations.

FIG. 2 shows an example of an AP 204 implementing an NUCA L3 cache hierarchy in accordance with various implementations. Put differently, the NUCA L3 cache hierarchy is a sub-hierarchy expressly for the L3 cache compared to the cache hierarchy that is applied to the L1, L2, and L3 caches. In some implementations, the AP 204 illustrated in FIG. 2 corresponds to the AP 104 of FIG. 1.

As illustrated in FIG. 2, the processor core die (PCD) 220 includes a plurality of CUs 212(1) to 212(N). In some implementations, each of the CUs 212(1) to 212(N) corresponds to the CUS 112(1) to 112(N) of FIG. 1. Accordingly, each of the CUs 212(1) to 212(N) includes a designated L1 cache (not shown). As further illustrated in FIG. 2, the PCD 220 also includes a plurality of L2 caches 216(1) to 216(K). In some implementations, the plurality of L2 caches 216(1) to 216(K) corresponds to L2 caches 116(1) to 116(K) of FIG. 1.

In addition to including the PCD 220, the AP 204 also includes a plurality of memory cache dies (MCDs) 218(1) to 218(6). In some AP 204 configurations, the total number of MCDs is less than or greater than the six MCDs shown in FIG. 2. In some implementations, the L3 cache of the AP 204 is implemented at the collection of MCDs 216-1 to 216-6. That is, each of the MCDs 216(1) to 216(6) holds an L3 cache. Furthermore, each of the MCDs 216(1) to 216(6) includes a die-to-die interface through a shared PHY interface point with the PCD 220. In the illustration shown in FIG. 2, the shared PHY interface point (IP) is depicted as PHY IP 230. Although shown as being separate from PCD 220, in some implementations, the PHY IP 230 is integrated into PCD 220. In some implementations, the PHY IP 230 is a SERDES circuitry with a clock domain crossing structure. The clock domain crossing structure may include, in some configurations, FIFO queues for processing the L3 cache access requests to the MCDs 218 based on a system on chip (SOC) clock (not shown) on the AP 204. One example of a FIFO queue 232 implemented at the PHY IP 230 is shown in FIG. 2. In some implementations, the FIFO queue 232 is a data structure for organizing the execution of write and read requests to the L3 caches in the different MCDs 218 and includes a write pointer 234 and a read pointer 236. The write pointer 234 is incremented when an item is written to the FIFO queue 232. That is, the write pointer 234 references the next position in the FIFO queue 232 to be filled (i.e., written). Similarly, when an item is read from the FIFO queue 232, the read pointer 236 is incremented. That is, the read pointer 236 references the next position in the FIFO queue 232 to be read from. The distance between the two pointers 234, 236 is referred to as the FIFO pointer separation 238 (also referred to as FIFO write-read pointer separation, FIFO read separation, pointer separation, or the like).

Conventional caching techniques treat the collection of L3 caches, and therefore each of the MCDs 218(1) to 218(6), equally based on a common FIFO pointer separation. That is, conventional caching techniques do not factor into account the different physical placements of the MCDs 218 on the AP 204 and assume the same FIFO pointer separation for MCD 216(1) as assumed for MCD (5), for example. This leads to higher write-to-read pointer separation, or higher latencies for clock-domain crossings, at the L3 cache.

On the other hand, the techniques described herein recognize the differences in the positions of the MCDs 218 on the AP 204 and exploit this information to differentiate the MCDs 218 to create an NUCA L3 cache hierarchy (also referred to as an LLC hierarchy). In some implementations, an L3 cache controller (L3 CC) 280 employs this information of the physical placement of the MCDs 218(1) to 218(6) to set the FIFO pointer separation in the FIFO queues in the PHY IP 230 for the corresponding MCDs 218. This FIFO pointer separation directly impacts the die-to-die interface (e.g., a USR interface between the PCD 220 and a corresponding one of the MCDs 218 of AP 204) roundtrip latency. In some implementations, the L3 CC 280 sets the FIFO pointer separation at the PHY IP 230 for every different position of the MCDs. That is, a different FIFO pointer separation is set for every distinct USR-PHY distance with the MCDs 218.

To illustrate this concept with respect to FIG. 2, MCD 218(1) and MCD 218(2) are at a first interface distance or length 250 (only one instance labeled for clarity) from the PHY IP 230 of the PCD 220. MCD 218(3) and MCD 218(4) are at a second interface distance or length 260 that is longer than the first interface distance 250. MCD 218(5) and MCD 218(6) are at a third interface distance or length 270 that is longer than the second interface distance 260. Thus, a first FIFO pointer separation is designated for MCDs 218(1) and 218(2), a second FIFO pointer separation is designated for MCDs 218(3) and 218(4), and a third FIFO pointer separation is designated for MCDs 218(5) and 218(6), where the first FIFO pointer separation is less than the second FIFO pointer separation, which in turn, is less than the third FIFO pointer separation. This in turn impacts the round trip latency for cache accesses to the respective MCDs 218. Table I is an example table summarizing the latencies (in nanoseconds (ns)) for the different MCDs 218 for AP 204.

TABLE I

|  | MCDs 218(1)&(2) | MCDs 218(3)&(4) | MCDs 218(5)&(6) |
| --- | --- | --- | --- |
| FIFO pointer separation | 0.2 ns | 0.4 ns | 0.6 ns |
| Impact on round trip latency | 0.8 ns | 1.6 ns | 2.4 ns |

Thus, as shown in Table I, by setting a different FIFO pointer separation based on the physical location of the MCDs 218 with respect to the PCD 220, the AP 204, in effect, realizes different memory access times to the different ones of the MCDs 218. The L3 CC 280 leverages these different memory access times to create an NUCA L3 cache hierarchy in which the MCDs with the fastest round trip latencies are assigned to higher levels in the hierarchy.

Figure 3:
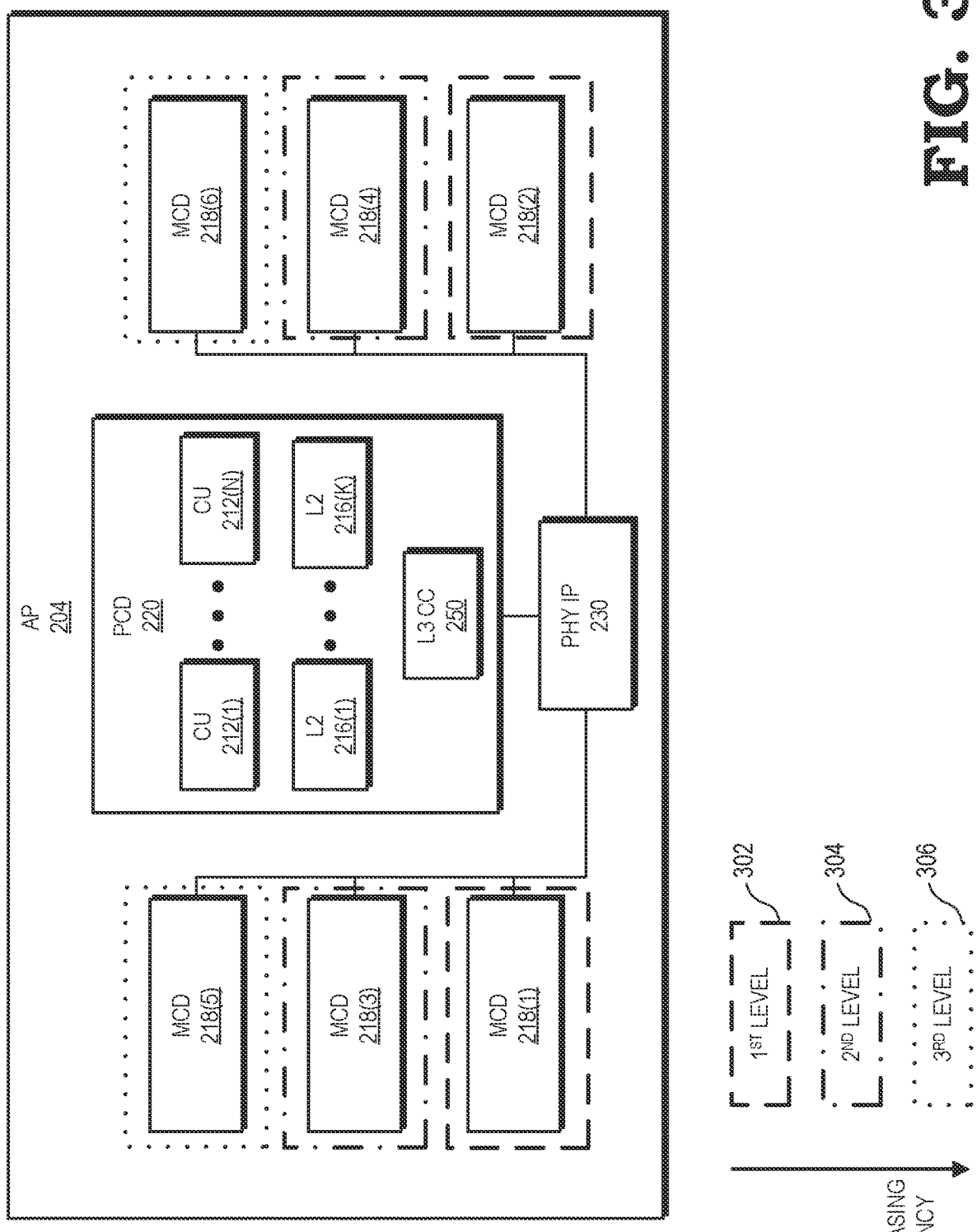

FIG. 3 shows an example of such a hierarchy based on the discussion above with respect to FIG. 2. As shown in FIG. 3, MCDs 218(1) and 218(2) are assigned to the first level (or highest level) 302 of the L3 cache hierarchy, MCDs 218(3) and 218(4) are assigned to the second level (or middle level) 304 of the L3 cache hierarchy, and MCDs 218(5) and 218(6) are assigned to the third level (or lowest level) 302 of the L3 cache hierarchy. The collection of levels 302 to 306 is collectively referred to as L3 cache levels, LLC levels, an LLC hierarchy, or the like. That is, the MCDs 218 are ranked according to their corresponding roundtrip latency times with the PCD 220. Thus, the L3 CC 280 leverages this non-uniform cache access (NUCA) architecture (non-uniform in the sense that the MCDs have different memory access times associated with them) to reduce the overall average L3 latency by placing more critical or more frequently used data blocks at the first level 302 L3 caches, and the least critical or least frequently used data blocks at the third level 306 of L3 caches. In some implementations, this NUCA L3 cache hierarchy is provided to higher levels of software or other applications running on the AP 204 or at the CPU (such as CPU 102) so that they can allocate data to the MCDs 218 based on NUCA L3 cache hierarchy aware data allocation policies. For example, for data or application allocated to an L3 cache of the AP 204, applications or data that are more critical or more frequently accessed by the CUs 212 are allocated to the first level MCDs (i.e., MCDs 218(1) and 218(2)). This reduces the latencies associated with L3 cache accesses, thereby improving overall system performance.

Figure 4:
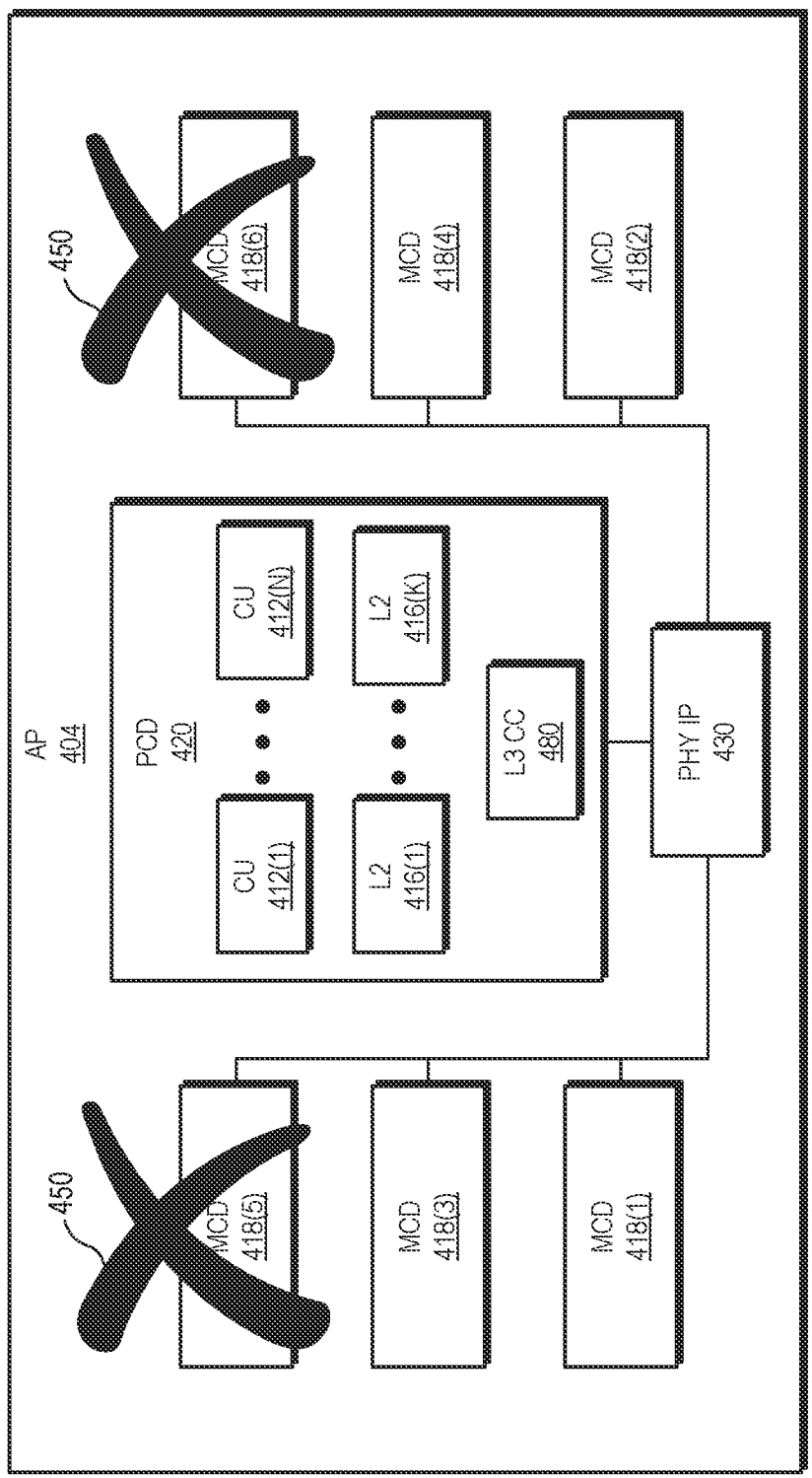
FIG. 4 shows an example configuration for populating memory cache die positions in an application processor with a reduced LLC size, in accordance with various implementations.

FIG. 4 shows an example of how the techniques described herein can be used to determine which MCD positions to populate for lower L3 cache processing devices in die harvesting, in accordance with various implementations. In some implementations, the accelerated processor (AP) 404 shown in FIG. 4 is similar to AP 104, 204, 304 but AP 404 is a lower product configuration with a reduced L3 cache size.

As illustrated in FIG. 4, the AP 404 includes a processor core die (PCD) 420 including a number of compute units (CUs) 412(1) to 412(N) and a number of L2 caches 416(1) to 416(K). In some implementations, the CUs 412 each includes a private L1 cache (not pictured). The PCD 420, in some implementations, also includes an L3 cache controller (CC) 480. A PHY IP 430 couples the PCD 420 with each of the MCDs 418.

In this example, this reduced cache size results in four MCD positions needing to be populated. In other implementations, the reduced cache size is a different number, e.g., two MCD positions are populated. By using the techniques described herein, the MCDs at position 418-5 and 418-6 are not populated (i.e., left empty, indicated by x-signs 450) since their associated cache latencies are higher than the other four MCDs 418-1 to 418-4. That is, the different MCD positions 418 are grouped into levels of an LLC hierarchy based on their corresponding physical attributes. In some implementations, the corresponding physical attribute is one or more or a die-to-die interface length between a memory cache die position 418 and the processor core die 420, or a physical location of the memory cache die position 418 on the AP 404. A first level of the LLC hierarchy includes a subset of the plurality of memory cache die positions having a shortest die-to-die interface length between the memory cache die position 418 and the processor core die 420, or a respective physical location closest to the processor core die 420 on the AP 404. For example, in FIG. 4, the positions associated with MCD 418(1) and MCD 418(2) are populated with MCDs prior to the positions associated with other ones of the MCDs 418. This results in improved L3 cache latencies for lower product configuration implementations compared to the conventional manner of die harvesting which does not differentiate between the MCDs implementing the L3 cache. Therefore, the techniques described herein can be used in die harvesting (i.e., selecting which die or chiplet positions to populate) to improve the overall performance of accelerated processors with reduced L3 cache sizes.

Any of the various elements or components shown in FIGS. 1-4, including the MC 110; the L3 CC 280, 480; the PHY IP 230, 430; and any other components associated with the APs 104, 204, 404 illustrated in FIGS. 1-4 are, in various implementations, implemented as one of software executing on a processor, hardware that is hard-wired (e.g., circuitry) to perform the various operations described herein, or a combination thereof.

Figure 5:
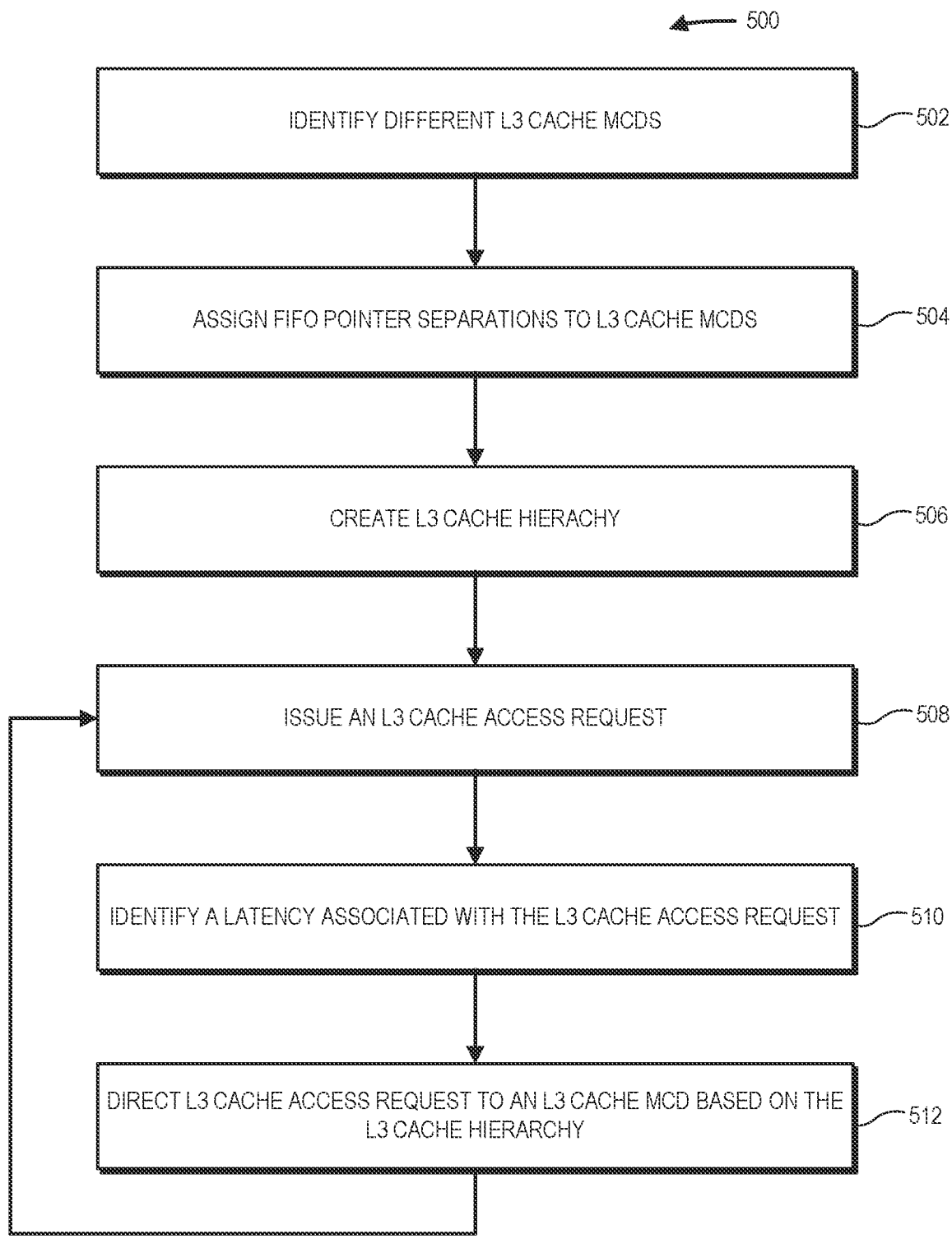
FIG. 5 is a flow diagram illustrating a method for creating and utilizing non-uniform cache access (NUCA) techniques at an accelerated processor, in accordance with various implementations.

FIG. 5 illustrates an example flowchart 500 describing a method for implementing NUCA L3 cache techniques in accordance with various implementations. For example, the NUCA L3 cache techniques described herein are applied by an accelerated processor (AP) having its L3 cache on different dies or chiplets than a processor core die including the processor cores. For example, the AP includes a processor core die with the processor cores (also referred to as CUs) as well as the L1 and L2 caches and a plurality of memory cache dies (MCDs) separate from the processor core die, where the MCDs include the L3 cache.

At block 502, the AP identifies the different MCDs and their corresponding die-to-die interface lengths with the processor core die. For example, with reference to FIG. 2, the AP 204 identifies a first die-to-die interface length 250 for MCDs 218(1) and 218(2), a second die-to-die interface length 260 for MCDs 218(3) and 218(4), and a third die-to-die interface length 270 for MCDs 218(5) and 218(6).

At block 504, the AP assigns different FIFO pointer separations for the FIFO queues issuing the cache accesses to the L3 cache based on the die-to-die interface lengths identified at block 502. For example, with reference to FIG. 2 and Table I, the AP 204 assigns FIFO pointer separations for the FIFO queues associated with each of the MCDs 218 based on the values shown in Table I. That is, the AP 204 assigns a FIFO pointer duration of 0.2 ns to MCDs 218(1) and 218(2), a FIFO pointer duration of 0.4 ns to MCDs 218(3) and 218(4), and a FIFO pointer duration of 0.6 ns to 218(5) and 218(6). In some implementations, by assigning different FIFO pointer durations to the MCDs, the impact on the round trip latencies of the cache access requests to the respective MCDs is tiered.

At block 506, the AP creates an L3 cache hierarchy based on the assigned FIFO pointer durations. That is, the AP groups or divides the MCDs based on the different tiers of round trip latencies created at block 504. For example, with reference to FIGS. 2 and 3, MCDs 218(1) and 218(2) have the shortest round trip latency time, so the AP 204 assigns them to a first level (e.g., 1st level 302) of an L3 cache hierarchy. MCDs 218(3) and 218(4) have the next shortest round trip latency time, so the AP 204 assigns them to the second level (e.g., 2nd level 304) of the L3 cache hierarchy. MCDs 218(5) and 218(6) have the longest round trip latency time, so the AP 204 assigns them to the third level (e.g., third level 306) of the L3 cache hierarchy. The first level of the cache hierarchy, for example, is reserved for critical or more frequent access data since the round trip latency time to access the first level of the L3 cache hierarchy is less than the other levels of the L3 cache hierarchy.

After the cache hierarchy is created, at block 508, the AP issues an L3 cache access request. For example, with reference to FIGS. 1 and 2, AP 104/204 issues an L3 cache access request based on an application running on a CPU (such as CPU 102 in FIG. 1) for which AP 104/204 is executing associated operations.

At block 510, the AP identifies a latency associated with the L3 cache access request of block 508. For example, with reference to FIGS. 1 and 2, AP 104/204 identifies that the L3 cache request is associated with a critical or frequently used application or data block. Accordingly, the AP determines that the L3 caches access requires the lowest latency.

At block 512, the AP directs the L3 cache access to the L3 cache MCD based on the L3 cache hierarchy. For example, with reference to FIGS. 2 and 3, the AP 204 directs the L3 cache access to the first level 302 in the L3 cache hierarchy including MCDs 218(1) and 218(2) if the AP 204 identifies that the L3 cache access request is identified as requiring the lowest latency at block 510. Thus, by directing the L3 cache access (e.g., write or read) to one of or both of MCDs 218(1) and 218(2), the AP 204 reduces the round trip latency time for executing the L3 cache access. This reduction in L3 cache latency improves system performance. The method further includes repeating blocks 508-512 for other L3 cache access requests.

In some implementations, the apparatus and techniques described above are implemented in a system including one or more integrated circuit (IC) devices (also referred to as integrated circuit packages or microchips), such as the AP or its components described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:
issuing a cache access request to a last level cache (LLC) in a cache hierarchy of an accelerated processor, the LLC located on a plurality of memory cache dies separate from a processor core die of the accelerated processor; and
based on a latency of the cache access request, directing the cache access request to a subset of the plurality of memory cache dies.

2. The method of claim 1, wherein directing the cache access request to the subset of the plurality of memory cache dies is based on the subset's corresponding die-to-die interface length with the processor core die.

3. The method of claim 2, further comprising:
assigning pointer separations to each of the plurality of memory cache dies, wherein the pointer separations are associated with queues for issuing access requests to each of the plurality of memory cache dies.

4. The method of claim 3, wherein the plurality of memory cache dies is configured as an LLC hierarchy, wherein each LLC level of a plurality of LLC levels of the LLC hierarchy corresponds to a different subset of the plurality of memory cache dies.

5. The method of claim 4, wherein each subset of the plurality of memory cache dies is assigned to one of the plurality of LLC levels of the LLC hierarchy based on the assigned pointer separations, wherein a first level of the LLC hierarchy is assigned to a subset of the plurality of memory cache dies with a lowest pointer separation.

6. The method of claim 2, wherein the corresponding die-to-die interface length is based on determining an interface length between each memory cache die of the plurality of memory cache dies and a shared physical interface point in the accelerated processor.

7. The method of claim 1, wherein the processor core die comprises a plurality of compute units and one or more higher cache levels of the cache hierarchy, wherein the higher cache levels comprise one or more level 1 (L1) caches and one or more level 2 (L2) caches, and wherein the LLC is a level 3 (L3) cache.

8. The method of claim 7, wherein the plurality of memory cache dies is arranged adjacent to the processor core die on the accelerated processor.

9. The method of claim 8, wherein the plurality of memory cache dies is divided into a plurality of subsets of memory cache dies based on their physical location on the accelerated processor, the plurality of subsets of memory cache dies comprising the subset of the plurality of memory cache dies.

10. An accelerated processor comprising:
a processor core die;
a plurality of memory cache dies coupled to the processor core die, the plurality of memory cache dies comprising a last level cache (LLC); and
an LLC controller to:
issue a cache access request to the LLC; and
based on a latency of the cache access request, direct the cache access request to a subset of the plurality of memory cache dies.

11. The accelerated processor of claim 10, further comprising:
a shared physical interface point between the plurality of memory cache dies and the processor core die.

12. The accelerated processor of claim 11, the shared physical interface point comprising serializer/deserializer circuitry comprising queues for issuing cache access requests to the LLC on the plurality of memory cache dies.

13. The accelerated processor of claim 12, wherein the queues are first in, first out (FIFO) queues.

14. The accelerated processor of claim 12, the LLC controller to:
based on each of the plurality of memory cache dies and their corresponding die-to-die interface length with the processor core die, assign pointer separations to each of the plurality of memory cache dies, wherein the pointer separations are associated with queues for issuing access requests to the LLC on the plurality of memory cache dies.

15. The accelerated processor of claim 14, the LLC controller to:
direct the cache access request to the subset of the plurality of memory cache dies based on an LLC hierarchy comprising a plurality of LLC levels, each LLC level of the plurality of LLC levels comprising a different subset of the plurality of memory cache dies, wherein each subset of the plurality of memory cache dies is assigned to one of the plurality of LLC levels of the LLC hierarchy based on the assigned pointer separations, wherein a first level of the LLC hierarchy is assigned to a subset of the plurality of memory cache dies with a lowest assigned pointer separation.

16. A non-transitory computer readable medium embodying a set of executable instructions, the set of executable instructions to manipulate at least one processor to:
issue a cache access request to a last level cache (LLC) in a cache hierarchy of an accelerated processor, the LLC located on a plurality of memory cache dies separate from a processor core die of the accelerated processor; and
based on a latency of the cache access request, direct the cache access request to a subset of the plurality of memory cache dies.

17. The non-transitory computer readable medium of claim 16, wherein directing the cache access request to the subset of the plurality of memory cache dies is based on the subset's corresponding die-to-die interface length with the processor core die.

18. The non-transitory computer readable medium of claim 17, further including instructions to manipulate the at least one processor to:
assign pointer separations to each of the plurality of memory cache dies, wherein the pointer separations are associated with queues for issuing access requests to each of the plurality of memory cache dies.

19. The non-transitory computer readable medium of claim 18, wherein the plurality of memory cache dies is configured as an LLC hierarchy, wherein each LLC level of a plurality of LLC levels of the LLC hierarchy corresponds to a different subset of the plurality of memory cache dies.

20. The non-transitory computer readable medium of claim 19, wherein each subset of the plurality of memory cache dies is assigned to one of the plurality of LLC levels of the LLC hierarchy based on the assigned pointer separations, wherein a first level of the LLC hierarchy is assigned to a subset of the plurality of memory cache dies with a lowest pointer separation.

\* \* \* \* \*